US005193656A

United States Patent [19]

Hoffmann et al.

[11] Patent Number: 5,193,656

[45] Date of Patent: Mar. 16, 1993

[54] COLLECTOR SHOE FOR COLLECTOR AND PROCESS FOR PRODUCING IT

[75] Inventors: Peter Hoffmann, Steeg; Johann Hoell, Hallstatt; Herbert Grabner; Klaus Reiser, both of Bad Ischl, all of Austria

[73] Assignee: Hoffmann & Co. Elektrokohle Gesellschaft mbH, Steeg, Austria

[21] Appl. No.: 907,263

[22] Filed: Jul. 1, 1992

Related U.S. Application Data

[62] Division of Ser. No. 634,158, filed as PCT/EP89/00710, Jun. 23, 1989, Pat. No. 5,152,380.

[30] Foreign Application Priority Data

Jun. 23, 1988 [DE] Fed. Rep. of Germany ....... 3921254

[51] Int. Cl.[5] .............................................. B60L 5/08

[52] U.S. Cl. ...................................... 191/49; 191/59.1

[58] Field of Search .................. 191/45 R, 47, 49, 50, 191/59, 59.1

[56] References Cited

FOREIGN PATENT DOCUMENTS

| | | | |
|---|---|---|---|
| 242039 | 2/1961 | Australia | 191/59.1 |
| 546178 | 4/1956 | Belgium | 191/59.1 |
| 547781 | 10/1957 | Canada | 191/59.1 |
| 71046 | 6/1942 | Czechoslovakia | 191/59.1 |
| 752289 | 6/1944 | Fed. Rep. of Germany | 191/59.1 |
| 958931 | 2/1957 | Fed. Rep. of Germany | 191/59.1 |
| 1006455 | 4/1957 | Fed. Rep. of Germany | 191/59.1 |
| 1149044 | 5/1963 | Fed. Rep. of Germany | 191/59.1 |
| 1257825 | 1/1968 | Fed. Rep. of Germany | 191/59.1 |
| 3104146 | 1/1982 | Fed. Rep. of Germany | 191/50 |
| 0206114 | 1/1984 | German Democratic Rep. | 191/59 |
| 0214095 | 10/1984 | German Democratic Rep. | 191/59.1 |
| 217806 | 9/1987 | Japan | 191/49 |
| 317753 | 1/1957 | Switzerland | 191/59.1 |

*Primary Examiner*—Michael S. Huppert
*Assistant Examiner*—Scott L. Lowe
*Attorney, Agent, or Firm*—Townsend and Townsend

[57] ABSTRACT

A collector shoe for a collector with a carbon brush and a support has, between the carbon brush and supporting element, a galvanically applied metallic layer. The galvanic layer anchors a head portion of a conductor member to the carbon brush. The conductor member has a shaft portion which projects through the support and secures the carbon brush to the support, as well as, establishes an electrical connection to the carbon brush.

1 Claim, 3 Drawing Sheets

COLLECTOR SHOE FOR COLLECTOR AND PROCESS FOR PRODUCING IT

This is a division of application Ser. No. 07/634,158 filed as PCT/EP89/00710, Jun. 23, 1989, now U.S. Pat. No. 5,152,380.

BACKGROUND OF THE INVENTION

The invention relates to a collector shoe for a collector of the type having an elongated carbon brush which is carried on a support member that extends over the length of the brush.

SUMMARY OF THE INVENTION

Collector shoes of the aforementioned type are typically designed with a carbon brush conductively connected to a profiled metal support so that electric current flows through the metal support. The electrically conductive connection is produced through soldering or, in accordance with German patent publication DE-OS 24 05 910, via an electrically conductive adhesive layer with metallic particles imbedded therein. It is also known to attach leads to the carbon brush e.g., by soldering them onto the metal layer, or by inserting them into a recess in the carbon brush and covering them with a metal layer (German patent DE-PS 697 808, German patent DE-PS 34 05 674 and German utility model DE-GM 87 166 985), in such a way that the electric current partially flows through the leads and the metal layer, bypassing the support member. However, attaching the leads requires additional manufacturing steps, which increases manufacturing costs. Moreover, soldering the leads or clamping them in the recess can also result in production errors, which may adversely affect the uniformity of current flow over the length of the carbon brush.

From the abstract of JP 59-99901 a collector strip is known which is mounted to an insulated support made of carbon and glass fiber-reinforced plastic. The collector strip lacks both a metallic layer or a longitudinally extending lead or similar element and the current is forced to flow within the strip itself to a connecting aluminum plate at the end of the strip. This results in a relatively high current resistance and generates substantial heat in the collector strip.

An object of the present invention is, therefore, to construct a collector shoe of the aforementioned type which provides in a simple manner, a precisely dimensioned, uniform current path over the entire length of the collector shoe.

This is achieved in accordance with the present invention by galvanically applying a metal layer to the surface of the carbon brush which faces the support member, giving the metal layer a sufficient cross section so that it can conduct the entire electric current, and extending the galvanically applied metal layer past an end of the carbon brush so that the protruding portion of the metal layer can be used to form the required electric connection.

BRIEF DESCRIPTION OF THE DRAWINGS

Embodiments invention are described in greater detail below with reference to the drawings, in which.

DESCRIPTION OF THE PREFERRED EMBODIMENTS

Figure 1A:
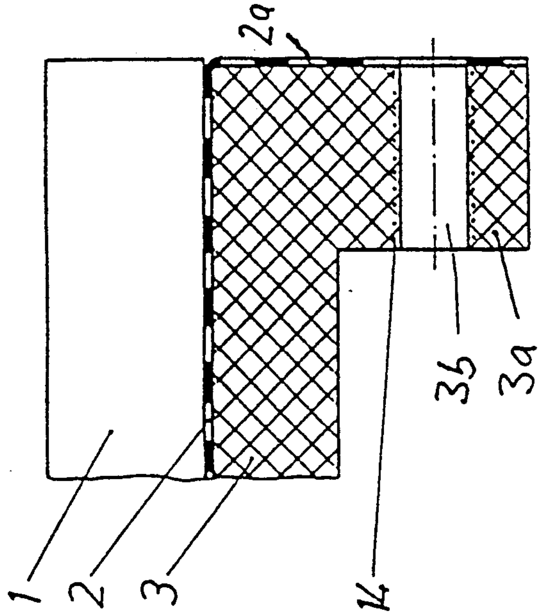
FIGS. 1 and 1*a* show a front view and a longitudinal cross section of a collector shoe constructed according to the present invention.
Figure 1:
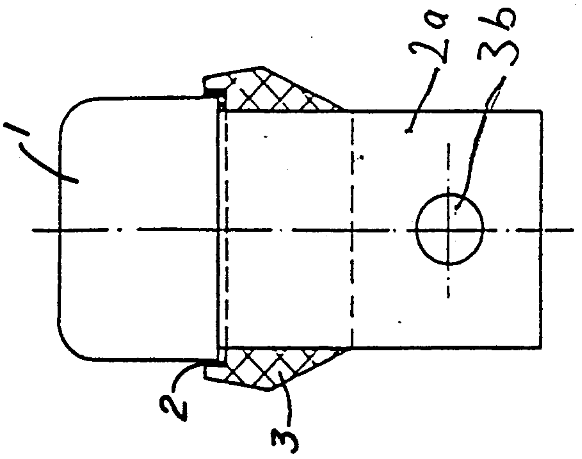

According to FIGS. 1 and 1*a*, a copper layer 2 is galvanically applied or plated to the underside of a carbon brush 1. The cross section of the copper layer 2 is sufficient to conduct the entire current. The carbon brush and copper layer 2 are connected to a support 3 made preferably of a plastic material. One especially advantageous manner of attaching the carbon brush to the support is by molding the support 3 of an uncured material directly onto carbon brush 1, or pressing a premolding support against the brush, and then curing the plastic to finish the support. When using plastic it is advantageous to use a fiber-reinforced plastic or a foamed plastic. The use of foamed plastic foam allows the carbon brush to be flexibly mounted on the support and it dampens the brush against vibrations.

An angled extension 3*a* is molded onto each end of support 3 which has a bore for receiving a fastener and which may be reinforced with a laminate 14 imbedded in the plastic. The galvanically applied copper layer 2 extends beyond the end of the carbon brush, defining an angled extension 2*a*. The angled copper layer overlies an outer frontal surface of the support 3 and extension 3*a*, and it is fixedly secured to the frontal surface. The extension 3*a*, which is covered on its outer surface by copper layer section 2*a*, serves to both mechanically secure the collector shoe and to establish an electric connection with metal layer 2 and carbon brush 1. Metallic layer section 2*a* has an opening aligned with bore 3*b*.

To make the collector shoe shown in FIGS. 1 and 1*a*, it is preferable to first produce carbon brush 1 with an excess length and then to galvanically plate a copper layer on it. Carbon brush 1 is then cut to the proper length in such a way that metal layer 2 remains unsevered, and an extension 2*a* of the metallic plating remains attached to carbon brush 1 after the severed portion of carbon is removed. Section 2*a* is then bent into the desired angled shape and support 3 is molded or otherwise attached to carbon brush 1 in the manner described above.

Figure 2A:
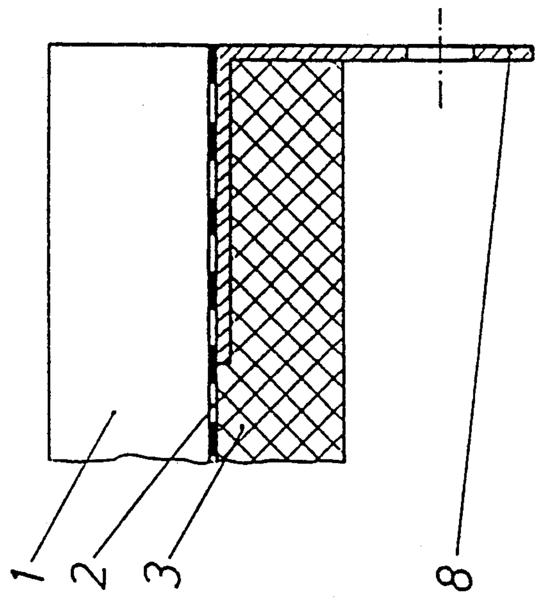
FIGS. 2 and 2*a* show corresponding views of an alternative embodiment of the present invention.
Figure 2:
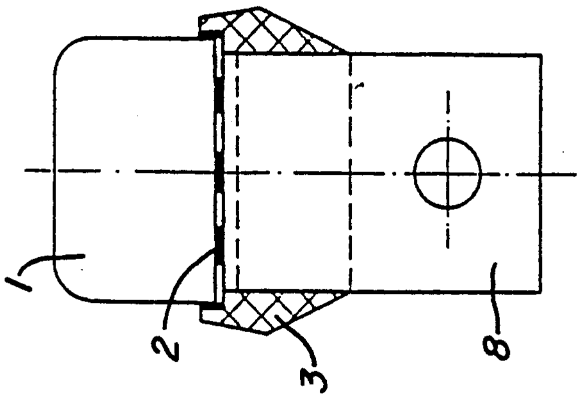

In the embodiment of FIG. 2 and 2*a* the galvanically applied copper layer 2 is cut flush with carbon brush 1. A copper angle 8 is soldered to copper layer 2. Next, support 3 made of a plastic material is directly molded onto carbon brush 1 and angular copper extension 8 such that the latter is embedded in and, hence, fixedly attached to plastic support 3. The angular copper extension functions both as a mechanical fastening securing as well as an electrical connection.

Figure 3:
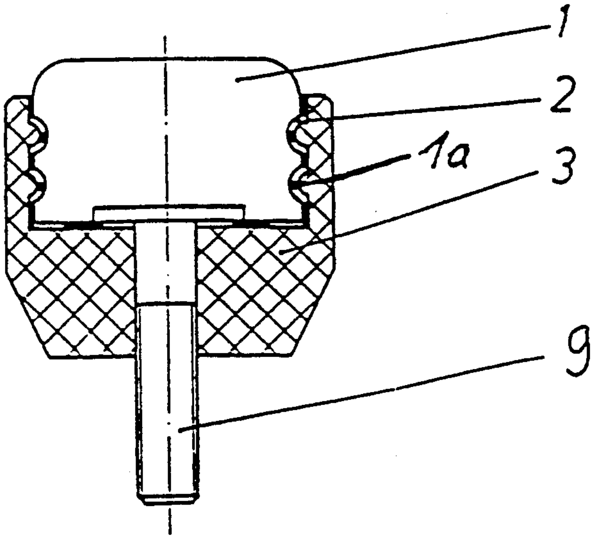
FIG. 3 is a cross-sectional end view of a collector shoe constructed according to a further embodiment of the present invention

In the embodiment according to FIG. 3 copper layer 2 is galvanically plated to three sides of carbon brush 1. The sides of carbon brush 1 are profiled to more firmly anchor the support member in place. Support 3, which is made of a plastic material, not only supports the underside of carbon brush 1 but surrounds the brush on three sides, over substantially the major portion of their height.

The head of a connecting bolt 9 is inserted in a recess in the underside of carbon brush 1 prior to application of the copper layer so that the latter anchors the bolt in place. Once the plastic support member has been molded in place the shaft of bolt 9 becomes imbedded in the support member. The projecting portion of bolt 9 serves to mechanically secure the collector shoe as well to establish an electrical connection.

Further modifications and rearrangements of the embodiments described herein are possible within the scope of the present invention. In the embodiment shown in FIGS. 2 and 2*a*, for example, the copper angle 8 may be replaced with a connecting element in the form of a tube-shaped copper sleeve that completely surrounds the end section of support member 3. In the embodiment shown in FIG. 3 the head of connecting bolt 9 can be soldered to the underside of copper layer 2. Moreover, bolt 9 may be given a copper core, to establish an optimum electrical connection with copper layer 2, and a surrounding steel jacket to enhance the rigidity of bolt 9.

We claim:

1. A collector comprising:

a support member, an elongated carbon brush supported on said support member, a layer of galvanically applied copper on an underside of the carbon brush facing the support member, and at least one conductor member having a head portion and a shaft portion, said head portion being inserted in a recess in the underside of said carbon brush and anchored therein by means of said galvanically applied copper, and said shaft portion extending from the underside of said carbon brush and into said support member.

* * * * *